United States Patent [19]

Kashiwazaki et al.

[11] Patent Number: 5,593,757
[45] Date of Patent: Jan. 14, 1997

[54] PRODUCTION PROCESS OF COLOR FILTER AND COLOR FILTER PRODUCED THEREBY

[75] Inventors: Akio Kashiwazaki; Hiroshi Sato, both of Yokohama; Katsuhiro Shirota, Kawasaki; Hideto Yokoi, Yokohama; Shoji Shiba, Sagamihara, all of Japan

[73] Assignee: Canon Kabushiki Kaisha, Tokyo, Japan

[21] Appl. No.: 489,735

[22] Filed: Jun. 13, 1995

[30] Foreign Application Priority Data

Jun. 17, 1994 [JP] Japan .................................. 6-158272
May 29, 1995 [JP] Japan .................................. 7-152733

[51] Int. Cl.⁶ .................................. B32B 3/00; B32B 27/14
[52] U.S. Cl. .................. 428/195; 428/201; 428/203; 428/204; 428/207; 428/212; 428/411.1; 428/423.1; 428/480; 428/500; 428/520; 428/522; 428/532; 347/101; 347/105
[58] Field of Search ................ 427/163.1; 428/195, 428/201, 203, 204, 207, 212, 411.1, 423.1, 480, 500, 520, 522, 532, 913; 347/101, 105

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,418,284 | 11/1983 | Ogawa et al. | 250/578 |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,698,113 | 10/1987 | Ogawa | 156/275.7 |
| 4,723,129 | 2/1988 | Endo et al. | 346/1.1 |
| 4,740,796 | 4/1988 | Endo et al. | 346/1.1 |
| 4,818,075 | 4/1989 | Takao et al. | 350/339 F |
| 4,846,556 | 7/1989 | Haneda | 350/317 |

(List continued on next page.)

FOREIGN PATENT DOCUMENTS

| | | |
|---|---|---|
| 0400738 | 12/1990 | European Pat. Off. . |
| 0552035 | 7/1993 | European Pat. Off. . |
| 54-056847 | 5/1979 | Japan . |
| 0123903 | 9/1982 | Japan . |
| 59-75205 | 4/1984 | Japan . |
| 59-123670 | 7/1984 | Japan . |
| 59-138461 | 8/1984 | Japan . |
| 60-71260 | 4/1985 | Japan . |
| 61-77014 | 4/1986 | Japan . |
| 63-235901 | 9/1988 | Japan . |

(List continued on next page.)

OTHER PUBLICATIONS

Patent Abstracts of Japan, vol. 13, No. 530 (Nov. 1989) (p.–966).
Patent Abstracts of Japan, vol. 16, No. 382 (Aug. 1992) (p.–1403).
Patent Abstracts of Japan, vol. 16, No. 197 (May 1992) (p.–1350).
Patent Abstracts of Japan, vol. 17, No. 526 (Sep. 1993) (p.–1617).
Patent Abstracts of Japan, vol. 17, No. 703 (Dec. 1993) (p.–1666).
Patent Abstracts of Japan, vol. 8, No. 183 (Aug. 1984) (p.–296).
Patent Abstracts of Japan, vol. 13, No. 37 (Jan. 1989) (p.–819).

*Primary Examiner*—William A. Krynski
*Attorney, Agent, or Firm*—Fitzpatrick, Cella, Harper & Scinto

[57] ABSTRACT

Disclosed herein is a process for producing a color filter, comprising the steps of: providing a plurality of color inks having different color properties from each other and a black ink; and ejecting the inks directly on a base or on a composition provided on the base using an ink-jet system to form a colored pattern, wherein a black matrix is formed with a black ink having a polarity opposite to that of the color inks.

28 Claims, 1 Drawing Sheet

U.S. PATENT DOCUMENTS

| | | | |
|---|---|---|---|
| 4,864,324 | 9/1989 | Shirota et al. | 346/1.1 |
| 4,965,612 | 10/1990 | Sakaki et al. | 346/1.1 |
| 4,981,614 | 1/1991 | Miyazaki et al. | 252/587 |
| 4,995,705 | 2/1991 | Yoshinaga et al. | 350/350 |
| 5,011,623 | 4/1991 | Yoshinaga et al. | 252/299.5 |
| 5,039,208 | 8/1991 | Ohnishi et al. | 359/100 |
| 5,079,214 | 1/1992 | Long et al. | 503/227 |
| 5,190,794 | 3/1993 | Yoshino et al. | 427/162 |
| 5,278,009 | 1/1994 | Iida et al. | 430/7 |
| 5,281,450 | 1/1994 | Yaniv | 427/165 |
| 5,317,434 | 5/1994 | Ohara | 359/68 |
| 5,340,619 | 8/1994 | Chen et al. | 424/498 |
| 5,358,558 | 10/1994 | Yamamoto et al. | 106/22 R |
| 5,418,094 | 5/1995 | Sato et al. | 430/7 |
| 5,420,708 | 5/1995 | Yokoyama et al. | 359/67 |

FOREIGN PATENT DOCUMENTS

| | | |
|---|---|---|
| 63-294503 | 12/1988 | Japan . |
| 1-217302 | 8/1989 | Japan . |
| 01217320 | 8/1989 | Japan . |
| 02228605 | 9/1990 | Japan . |
| 0310220 | 1/1991 | Japan . |
| 4-123005 | 4/1992 | Japan . |
| 04317007 | 11/1992 | Japan . |
| 04349401 | 12/1992 | Japan . |
| 05288913 | 11/1993 | Japan . |
| 9324240 | 12/1993 | WIPO . |

PRODUCTION PROCESS OF COLOR FILTER AND COLOR FILTER PRODUCED THEREBY

BACKGROUND OF THE INVENTION

1. Field of the Invention

The present invention relates to a production process of a color filter suitable for use in color liquid crystal displays used in color televisions, personal computers and the like. In particular, the present invention relates to a production process of a color filter for liquid crystals making good use of an ink-jet recording technique, and a color filter for liquid crystals produced in accordance with this production process.

2. Related Background Art

With the spread of personal computers, particularly, portable personal computers in recent years, the demand for liquid crystal displays, particularly, color liquid crystal displays tends to increase. It is however necessary to reduce the cost of the color liquid crystal displays for further disseminating. There is an increasing demand for reduction in the cost of color filters.

Various methods such as those described below have heretofore been attempted for meeting the demand for reduction in the cost of color filters while satisfying the properties required of the color filters. However, no method satisfying all the required properties is yet established under the circumstances.

The first method most often used as a production process of color filters is a dyeing process. In the dyeing process, a sensitizing agent is added to a water-soluble polymeric material, which is a material for dyeing, to sensitize the polymeric material. The thus-sensitized polymeric material is applied on a glass base. After the coating film thus formed is patterned in the desired form by a photolithograph process, the glass base on which the coating film has been patterned is immersed in a dye bath to obtain a colored pattern. This process is repeatedly performed three times separately with coloring materials of different colors to form a color filter layer composed of three colored patterns of red, green and blue (hereinafter abbreviated as "R", "G" and "B", respectively).

The second method often used is a pigment dispersing process which has been replacing the dyeing process in recent years. In this process, a layer of a photosensitive resin in which a pigment of an R, G or B color has been dispersed is first formed on a base and then subjected to patterning, thereby obtaining a pattern of a single color. This process is repeatedly performed three times with the color of the pigment varied to form a color filter layer composed of three colored patterns of R, G and B.

As the third method, there is an electrodeposition process. In this process, a transparent electrode is first patterned on a base. The base is then immersed in an electrodeposition coating fluid containing a pigment, resin, electrolytic solution and the like to electrically deposit the first color. This process is repeatedly performed three times to form a color filter layer composed of three colored patterns of R, G and B. Finally, the color filter layer is calcined to be finished.

As the fourth method, there is a printing process in which three coatings of R, G and B colors, each comprising a thermosetting resin and a pigment dispersed therein, are separately applied by repeated printing, and the resin to become each colored layer is then thermoset to form a color filter layer composed of three colored patterns.

It is the general practice to form a protective layer on the colored layers formed in each process.

The need for repeating the same process three times to form the colored patterns of R, G and B is common to the above-described four production processes. Consequently, the production process becomes complicated, and the production cost is necessarily increased. There is also the problem that the yield is reduced as the number of processes increases.

In the third process by electrodeposition, besides, formable patterns are limited. This process hence involves a problem that it cannot be applied to a TFT color liquid crystal display in the existing technique. The fourth process involves the drawback that resolution and smoothness are poor, and is hence accompanied by the problem that high-definition patterns fine in pitch cannot be formed.

In order to solve these drawbacks, a color filter has been produced by using an ink-jet system to apply inks of R, G and B colors to a glass base having a black matrix. Such processes are described in, for example, Japanese Patent Application Laid-Open Nos. 59-75205, 63-235901, 1-217302 and 4-123005. However, even if this method is used, the production cost of the color filter remains great because the black matrix used is formed from a metal. In addition, the pattern of the black matrix also cannot be changed easily.

SUMMARY OF THE INVENTION

It is accordingly an object of the present invention to provide a production process of a color filter, which permits the optional formation of a black matrix having desired patterns, and moreover the production of a high-definition color filter at low cost.

The above object can be achieved by the present invention described below.

According to the present invention, there is thus provided a process for producing a color filter, comprising the steps of: providing a plurality of color inks having different color properties from each other and a black ink; and ejecting the inks directly on a base or on a composition provided on the base using an ink-jet system to form a colored pattern, wherein a black matrix is formed with a black ink having a polarity opposite to that of the color inks.

According to the present invention, there is also provided a color filter produced by any one of the processes described above.

DESCRIPTION OF THE PREFERRED EMBODIMENTS

The present inventors have found that when an ink-jet system is used to also form a black matrix, bleeding occurs at boundaries between the patterns of the black matrix and the colored patterns of R, G and B taking no account of the matching of a black ink with R, G and B inks, and so difficulties are encountered on the formation of higher-definition patterns, thus leading to completion of the present invention.

More specifically, according to the present invention, there is provided a process for cheaply producing a color filter having a black matrix with optional patterns, in which the process permits the formation of high-definition patterns free of any bleeding at boundaries between the patterns of the black matrix and the colored patterns of R, G and B.

The present invention will hereinafter be described in detail with reference to the accompanying drawings.

Figure 1:
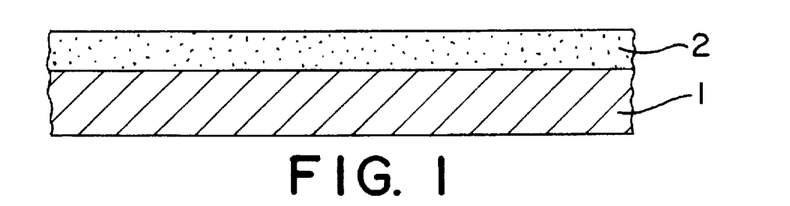
FIG. 1 illustrates an exemplary base prior to the formation of patterns, which is to be used for the production of a color filter.
Figure 2:
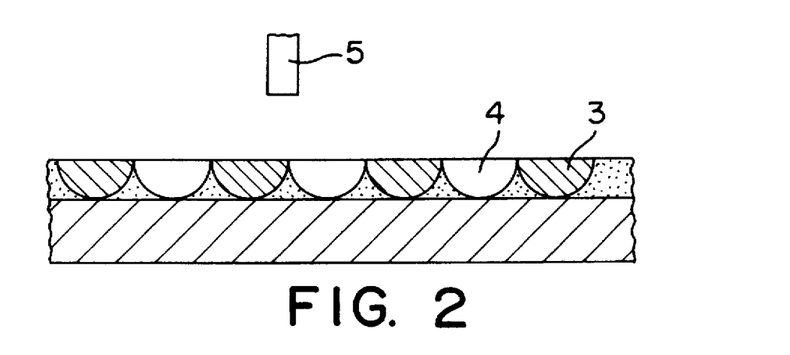
FIG. 2 illustrates the condition of a color filter in which a black pattern and colored patterns of R, G and B have been formed by a process according to the present invention.
Figure 3:
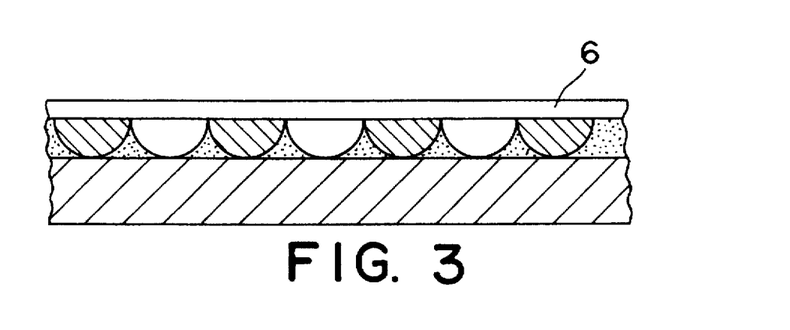
FIG. 3 illustrates an exemplary color filter produced by the process according to the present invention.

FIGS. 1 to 3 illustrate a production process of a color filter for liquid crystals according to the present invention and an exemplary construction of a color filter for liquid crystals according to the present invention.

In the present invention, a glass base is generally used as a base. However, the base is not limited to a glass base so far as it has the properties required of the color filter for liquid crystals, such as transparency and mechanical strength.

As illustrated in FIG. 1, a resin composition is first applied onto a transparent glass base 1 washed by a method known per se in the art to provide a resin composition layer 2 as an ink-receiving layer. Although this ink-receiving layer may not be provided, it is more preferable to provide the ink-receiving layer for enhancing the ink-receptive property of the base. In this formation of the ink-receiving layer, a coating formulation prepared by dissolving or dispersing materials for the resin composition in a suitable solvent is applied onto the base by a coating process such as a roll coater process, blade coater process, air-knife coater process, rod bar coater process or spin coater process, and is baked in an oven or on a hot plate, thereby evaporating the solvent to form a film. The thickness of the film to be formed is suitably about 0.1 to 20 μm though it varies according to the kinds, ejection quantities, field of use or the like of the inks to be used. If the thickness is thinner than 0.1 μm, the film cannot exhibit its function as an ink-receiving layer, and hence becomes insufficient to absorb the inks therein and is rather liable to cause problems of image irregularity and bleeding. On the other hand, any thickness of the film exceeding 20 μm impairs the transparency of the base and is not preferable from the viewpoint of economy.

No particular limitation is imposed on the material for the formation of the ink-receiving layer so far as it can absorb ink to some extent. It is however necessary for the material to satisfy process resistance such as heat resistance. As specific examples of such materials, may be mentioned synthetic resins such as polyvinyl pyrrolidone, polyvinyl alcohol, polyvinyl acetal, polyurethane, carboxymethylcellulose, polyester, polyacrylic acid (esters), hydroxyethylcellulose, hydroxypropylcellulose, melamine resins and modified products of these polymers; and natural resins such as albumin, gelatin, casein, starch, cationic starch, gum arabic and sodium alginate. Of these, acrylic resins and cellulose derivatives such as hydroxypropylcellulose are particularly preferably used. A plurality of these materials may be selected and used at the same time.

After the thus-formed film is prebaked as needed, as illustrated in FIG. 2, black matrix patterns 3 and colored patterns 4 of R, G and B with a plurality of color inks having different color properties from each other are then printed at the same time on the ink-receiving layer formed using an ink-jet head 5. As the ink-jet system used in the formation of these patterns, there may be used an ink-jet system of the bubble-jet type making use of an electrothermal converter as an energy-generating element or the piezo-jet type making use of a piezoelectric element. According to such a system, coloring areas and coloring patterns may be optionally preset.

As the inks used in the above-described formation of patterns in the present invention, any known inks may be used so far as the polarities of a black ink and a plurality of color inks having different color properties from each other are in opposed relation to each other. More specifically, when the black ink contains an anionic compound, inks containing a cationic compound are used as the color inks. When the black ink contains a cationic compound on the contrary, inks containing an anionic compound are used as the color inks.

As well known in the art, a black pattern always adjoins colored patterns. For example, red and green patterns, red and blue patterns, or green and blue patterns do not hence adjoin. Accordingly, when the polarities of the black ink and color inks used in the formation of these patterns are made opposite to each other, the substances different in polarity always come into contact with each other, so that the inks instantaneously start to aggregate, and the migration of the inks themselves is hence inhibited. As a result, the occurrence of bleeding at boundaries between the patterns of the black matrix and the colored patterns of R, G and B is reduced to the minimum.

No particular limitation is imposed on the anionic compound mixed in ink(s) with a view toward imparting a specific polarity to the ink(s) so far as it contains an anionic moiety in its molecule. Specific examples of such an anionic compound include anionic surfactants such as alkylbenzenesulfonates, salts of alkylsulfuric esters, alkylnaphthalenesulfonates, alkylphosphates, alkylsulfosuccinates, naphthalenesulfonic acid-formalin condensates and polyoxyethylene alkylphosphates. Besides, amphoteric surfactants such as alkylbetaines, imidazolinium betaines and alanine derivatives, which contain an anionic moiety, may be used.

Anionic polymers or oligomers, which are anionic compounds, may also be preferably used. As the anionic polymers or oligomers, may be mentioned those having at least one anionic group such as a sulfonic group, carboxyl group, sulfate group, phosphate group, phenolic hydroxyl group or alcoholic hydroxyl group in their molecules. Specific examples of such polymers or oligomers suitable for use in the present invention include carboxyl group-terminated polyesters obtained by reacting a polycarboxylic acid with a polyhydric alcohol, acid cellulose derivatives obtained by modification with various kinds of polycarboxylic acids, homopolymers of vinyl ether polycarboxylate monomers or their copolymers with other common monomers, homopolymers of (meth)acrylic acid or their copolymers with other common monomers, homopolymers of α,β-unsaturated vinyl monomers such as maleic anhydride and itaconic acid or their copolymer with other common monomers, sulfonic acid-modified polymers obtained by treating polyvinyl alcohol or vinyl alcohol copolymers with a sulfonic compound, and hydroxyl group-containing compounds such as ethylcellulose, benzylcellulose, hydroxyethylcellulose and hydroxypropylcellulose. Besides the above compounds, any compound may be used so far as it has at least one sulfonic group, carboxyl group, sulfate group, phosphate group, phenolic hydroxyl group, alcoholic hydroxyl group or the like.

On the other hand, no particular limitation is imposed on the cationic compound mixed in ink(s) with a view toward imparting a specific polarity to the ink(s) so far as it contains a cationic moiety in its molecule. Specific examples of such a cationic compound include cationic surfactants of the quaternary ammonium salt type, such as monoalkylammonium chlorides, dialkylammonium chlorides, tetramethylammonium chloride, trimethylphenylammonium chloride and ethylene oxide-added ammonium chlorides, and cationic surfactants of the amine salt type. Besides, amphoteric surfactants such as alkylbetaines, imidazolinium betaines and alanine derivatives, which contain a cationic moiety, may be used.

Cationic polymers or oligomers, which are cationic compounds, may also be preferably used. As specific examples of the cationic polymers or oligomers, may be mentioned cationically modified products of polyacrylamide or copolymers of acrylamide and a cationic monomer, polyallylamine, polyamine sulfone, polyvinylamine, polyethyleneimine, polyamide-epichlorohydrin resins, and polyvinylpyridinium halides. Besides, homopolymers of vinylpyrrolidone monomers or their copolymers with other common monomers, homopolymers of vinyloxazolidone monomers or their copolymers with other common monomers, homopolymers of vinylimidazole monomers or their copolymers with other common monomers, etc. may be mentioned.

Incidentally, the common monomers include methacrylates, acrylates, acrylonitrile, vinyl ethers, vinyl acetate, ethylene, styrene and the like. Further, cationically modified polyvinyl alcohol and cellulose may be used. It goes without saying that the cationic polymers or oligomers are not limited to these compounds.

It is preferred that the content of the anionic compound or cationic compound in an ink be controlled to about 0.01 to 20% by weight so as to be sufficient to impart a specific polarity to the ink.

As with inks commonly used, the ink-jet inks used in the present invention each comprise, in addition to the anionic or cationic compound for imparting a specific polarity to the inks, a colorant, an aqueous medium and various additives added as necessary.

Both dyes and pigments may suitably be used as the colorant contained in the ink. Examples of dyes used include C.I. Acid Red 118, C.I. Acid Red 254, C.I. Acid Green 25, C.I. Acid Blue 113, C.I. Acid Blue 185, C.I. Acid Blue 7 and C.I. Food Black 2 to which, however, the invention is not limited.

On the other hand, examples of pigments used include C.I. Pigment Red 177, C.I. Pigment Red 5, C.I. Pigment Red 12, C.I. Pigment Green 36, C.I. Pigment Blue 209 and C.I. Pigment Blue 16 to which, however, the invention is not limited.

The dyes or pigments contained in the ink-jet inks may preferably be used in a proportion ranging from 0.1 to 20% by weight based on the total weight of the ink.

If a pigment is used as a colorant, one of the above-described cationic compounds, anionic compounds or amphoteric compounds may be used as a dispersing agent.

As the aqueous medium suitable for use in the preparation of the ink-jet inks used in the present invention, there may be used a mixed solvent of water and at least one water-soluble organic solvent. As the water, it is preferable to use ion-exchanged water (deionized water) instead of tap water containing various ions.

Examples of the optional water-soluble organic solvent used in combination with water in the inks include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and keto-alcohols such as acetone and diacetone alcohol; ethers such as tetrahydrofuran and dioxane; polyalkylene glycols such as polyethylene glycol and polypropylene glycol; alkylene glycols of which the alkylene moiety has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; N-methyl-2-pyrrolidone; 2-pyrrolidone; and 1,3-dimethyl-2-imidazolidinone. Of these water-soluble organic solvents, polyhydric alcohols such as diethylene glycol and lower alkyl ethers of polyhydric alcohols, such as triethylene glycol monomethyl (or monoethyl) ether are particularly preferred.

In order to achieve good ejection stability, it is effective to further add ethanol, isopropyl alcohol or a lower alkyl ether of a polyhydric alcohol because the addition of these solvents is considered to permit more stable bubbling of the inks on a thin film resistor.

In general, the content of the water-soluble organic solvents in each of the ink-jet inks used in the present invention is preferably within a range of from 3 to 50%, more preferably from 3 to 40% by weight based on the total weight of the ink.

The content of water in the ink is within a range of from 10 to 95% by weight, preferably from 20 to 85% by weight based on the total weight of the ink.

Further, the ink-jet inks used in the present invention may contain, in addition to the above-described components, surfactants, antifoaming agents, antiseptics and the like as needed to provide them with desired physical properties. Commercially-available water-soluble dyes and/or the like may also be added thereto.

No particular limitation is imposed on the surfactants used so far as they are those as mentioned above and do not adversely affect the storage stability and the like of the inks. Examples of such surfactants include anionic surfactants such as fatty acid salts, sulfuric ester salts of higher alcohols, sulfuric ester salts of liquid fatty oils and alkylallylsulfonates; and nonionic surfactants such as polyoxyethylene alkyl ethers, polyoxyethylene alkyl esters, polyoxyethylene sorbitan alkyl esters, acetylene alcohols and acetylene glycols. These surfactants may be suitably chosen for either single use or combined use.

Examples of the pH adjustor added into the inks, which must be subjected to pH adjustment for ensuring the safety of the inks, include ammonia, various kinds of organic amines such as diethanolamine and triethanolamine, inorganic alkalis such as the hydroxides of alkali metals, for example, sodium hydroxide, lithium hydroxide, potassium hydroxide, etc., organic acids, and inorganic acids.

As illustrated in FIG. 3, a protective layer 6 is then formed on the black matrix patterns and R, G and B patterns formed in the above-described manner as needed. Any protective layer may be used as the protective layer 6 so far as it has sufficient transparency to be used in a color filter for liquid crystals and withstands subsequent ITO-forming process, orientation film-forming process and the like. For example, a resin film formed from a resin material capable of curing by exposure to light or heat treatment or both of them, or an inorganic film formed by vapor deposition or sputtering may be used.

The present invention will hereinafter be described more specifically by the following Examples. However, the present invention is not limited to these examples only. Incidentally, all designations of "part" or "parts" as will be used in the following examples mean part or parts by weight unless expressly noted.

EXAMPLE 1:

A 7059 glass base (product of Corning Company) was washed by the method known per se in the art, and an aqueous solution of hydroxypropylcellulose (HPC-H, product of Nippon Soda Co., Ltd.) was applied onto one side of the glass base by a roll coater process, so as to give a dry coating thickness of 2 μm of an ink-receiving layer. The thus-coated glass base was baked at 120° C. for 10 minutes in an oven to obtain a transparent base provided with the ink-receiving layer.

An ink-jet printing head, which caused inks to bubble by thermal energy to eject them, was then charged with 4 kinds of inks having the following respective compositions to simultaneously print patterns of black, red, green and blue colors on the ink-receiving layer of the transparent base.

| Composition of black ink: | |
| --- | --- |
| Black dye (C.I. Food Black 2) | 5 parts |
| Ethylene glycol | 10 parts |
| Isopropyl alcohol | 3 parts |
| Na salt of naphthalenesulfonic acid-formalin condensate | 1 part |
| Deionized water | 81 parts. |
| Composition of red ink: | |
| Dye (C.I. Acid Red 118) | 3 parts |
| Ethylene glycol | 10 parts |
| Isopropyl alcohol | 3 parts |
| Polyethyleneimine | 1 part |
| Deionized water | 83 parts. |
| Composition of green ink: | |
| Dye (C.I. Acid Green 25) | 3 parts |
| Ethylene glycol | 10 parts |
| Isopropyl alcohol | 3 parts |
| Polyethyleneimine | 1 part |
| Deionized water | 83 parts. |
| Composition of blue ink: | |
| Dye (C.I. Acid Blue 113) | 3 parts |
| Ethylene glycol | 10 parts |
| Isopropyl alcohol | 3 parts |
| Polyethyleneimine | 1 part |
| Deionized water | 83 parts. |

A thermosetting resin, Hicoat LC-2001 (product of Sanyo Chemical Industries, Ltd.) was then applied as a protective layer by a spin coater onto the ink-receiving layer, on which the patterns of the black matrix and R, G and B colors had been printed, so as to give a dry coating thickness of 0.5 μm. The thus-formed film was prebaked at 120° C. for 30 minutes and then completely baked at 200° C. for 30 minutes to form a protective layer, thereby obtaining a color filter for liquid crystals according to this example.

EXAMPLE 2:

A color filter for liquid crystals according to this example was obtained in the same manner as in Example 1 except that the Na salt of the naphthalenesulfonic acid-formalin condensate, which was an anionic compound in the black ink used in Example 1, and the polyethyleneimine, which was a cationic compound in the R, G and B inks, were changed to the ammonium salt of a styrene-maleic acid copolymer and polyallylamine, respectively.

EXAMPLE 3:

A color filter for liquid crystals according to this example was obtained in the same manner as in Example 1 except that the Na salt of the naphthalenesulfonic acid-formalin condensate, which was an anionic compound in the black ink used in Example 1, and polyethyleneimine, which was a cationic compound in the R, G and B inks, were changed to the polyethyleneimine, which was a cationic compound, and the Na salt of the naphthalenesulfonic acid-formalin condensate, which was an anionic compound, respectively.

EXAMPLE 4:

A 7059 glass bass (product of Corning Co.) was washed by the method known per se in the art, and an aqueous solution of an acrylic-silicon graft polymer (Simac 450, product of Toagosei Chemical Industry Co., Ltd.) was applied onto one side of the glass base by a spin coating process, so as to give a dry coating thickness of 2 μm of an ink-receiving layer. The thus-coated glass base was baked at 120° C. for 10 minutes in an oven to obtain a transparent base provided with the ink-receiving layer.

An ink-jet printing head of a system that inks were caused to bubble by thermal energy to eject them was then charged with 4 kinds of inks having the following respective compositions to simultaneously print patterns of black, red, green and blue colors on the ink-receiving layer of the transparent base.

| Composition of black ink: | |
| --- | --- |
| Carbon black (MCF-88, product of Mitsubishi Chemical Industries Limited) | 5 parts |
| Polyvinyl pyrrolidone | 0.8 part |
| Ethylene glycol | 10 parts |
| Isopropyl alcohol | 3 parts |
| Glycerol | 5 parts |
| Deionized water | 76.2 parts. |

Incidentally, the polyvinyl pyrrolidone used in this example also fulfills a function as a dispersing agent for the carbon black which is a black pigment.

| Composition of red ink: | |
| --- | --- |
| Pigment (C.I. Pigment Red 177) | 3 parts |
| Ammonium salt of styrene-acrylic acid copolymer | 0.5 part |
| Ethylene glycol | 10 parts |
| Isopropyl alcohol | 3 parts |
| Glycerol | 5 parts |
| Deionized water | 78.5 parts. |
| Composition of green ink: | |
| Pigment (C.I. Pigment Green 36) | 3 parts |
| Ammonium salt of styrene-acrylic acid copolymer | 0.5 part |
| Ethylene glycol | 10 parts |
| Isopropyl alcohol | 3 parts |
| Glycerol | 5 parts |
| Deionized water | 78.5 parts. |
| Composition of blue ink: | |
| Pigment (C.I. Pigment Blue 209) | 3 parts |
| Ammonium salt of styrene-acrylic acid copolymer | 0.5 part |
| Ethylene glycol | 10 parts |
| Isopropyl alcohol | 3 parts |

| Glycerol | 5 parts |
| Deionized water | 78.5 parts |

A thermosetting resin, Hicoat LC-2001 (product of Sanyo Chemical Industries, Ltd.) was then applied as a protective layer by a spin coater onto the ink-receiving layer, on which the patterns of the black matrix and R, G and B colors had been printed, so as to give a dry coating thickness of 0.5 µm. The thus-formed film was prebaked at 120° C. for 30 minutes and then completely baked at 200° C. for 30 minutes to form a protective layer, thereby obtaining a color filter for liquid crystals according to this example.

EXAMPLE 5:

A color filter for liquid crystals according to this example was obtained in the same manner as in Example 4 except that the polyvinyl pyrrolidone, which was a cationic dispersing agent in the black ink used in Example 4, and the ammonium salt of the styrene-acrylic acid copolymer, which was an anionic dispersing agent in the R, G and B inks, were changed to the ammonium salt of the styrene-acrylic acid copolymer, which was an anionic dispersing agent, and the polyvinyl pyrrolidone, which was a cationic dispersing agent, respectively.

The color filters for liquid crystals produced in Examples 1 to 5 were observed through an optical microscope. As a result, no problems such as color change, bleeding at boundaries between the patterns of the black matrix and the colored patterns of R, G and B, and color irregularity were observed.

Besides, each of the thus-obtained color filters for liquid crystals according to Examples 1 to 5 was used to conduct a series of operations such as formation of ITO, formation of orientation films and charging of a liquid crystal material, thereby producing a color liquid crystal drive unit. The thus-produced color liquid crystal drive unit was continuously run for 1,000 hours in a temperature range of from 0° C. to 40° C. As a result, no trouble occurred. This color liquid crystal drive unit was arranged on an OHP to perform continuous projection for 1,000 hours. Changes in transmittance and color tone were not recognized even after the lapse of 1,000 hours.

COMPARATIVE EXAMPLE 1:

A comparative color filter for liquid crystals was obtained in exactly the same manner as in Example 1 except that the polyethyleneimine contained in the R, G and B inks in Example 1 was changed to the Na salt of a naphthalenesulfonic acid-formalin condensate, and four inks of black, R, G and B colors in this comparative example were all constituted so as to contain the anionic compound therein.

COMPARATIVE EXAMPLE 2:

A comparative color filter for liquid crystals was obtained in exactly the same manner as in Example 4 except that the ammonium salt of the styrene-acrylic acid copolymer, which was an anionic dispersing agent contained in the R, G and B inks in Example 4, was changed to polyvinyl pyrrolidone, which was a cationic dispersing agent, and four inks of black, R, G and B colors in this comparative example were all constituted so as to contain the cationic dispersing agent therein.

The comparative color filters for liquid crystals produced in Comparative Examples 1 and 2 were observed through an optical microscope. As a result, it was recognized that bleeding occurred at boundaries between the patterns of the black matrix and the colored patterns of R, G and B, and so they had great trouble in function.

According to the present invention, high-definition patterns free of any bleeding at boundaries between the patterns of the black matrix and the colored patterns of R, G and B can be obtained even when their patterns are formed at the same time. There is thus no need for repeatedly performing respective processes of forming colored patterns of R, G and B to produce a color filter like the prior art processes. Therefore, the production processes can be shortened, and color filters higher in reliability and definition as described above can be cheaply provided.

Besides, according to the present invention, color filters having a black matrix with optional patterns can be produced with ease.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. A process for producing a color filter, comprising the steps of:

providing color inks of red, green and blue and a black ink having a polarity opposite to that of the color inks; and applying the color inks and the black ink directly on a base or on a heat-resistant resin layer provided on the base using an ink-jet system to form colored and black patterns wherein the black pattern is formed with a black ink so as to adjoin the colored pattern.

2. The process according to claim 1, wherein the black ink comprises a cationic compound and each of the color inks comprises an anionic compound.

3. The process according to claim 2, wherein said anionic compound includes anionic surfactant, anionic polymer or oligomer.

4. The process according to claim 3, wherein said anionic surfactant includes alkylbenzenesulfonate, salt of alkylsulfuric ester, alkylnaphthalenesulfonate, alkylphosphate, alkylsulfosuccinate, naphthalenesulfonic acid-formalin condensate or polyoxyethylene alkylphosphate.

5. The process according to claim 3, wherein said anionic polymer or oligomer includes carboxyl group-terminated polyester obtained by reacting a polycarboxylic acid with a polyhydric alcohol, acid cellulose derivative obtained by modification with polycarboxylic acid, homopolymer of vinyl ether polycarboxylate monomer, homopolymer of (meth)acrylic acid, homopolymer of $\alpha$, $\beta$ unsaturated vinyl monomer, sulfuric acid-modified polymer obtained by treating polyvinyl alcohol or vinyl alcohol copolymer with a sulfonic compound, ethylcellulose, benzylcellulose, hydroxyethylcellulose or hydroxypropylcellulose.

6. The process according to claim 2, wherein said cationic compound includes cationic surfactant, cationic polymer or oligomer.

7. The process according to claim 6, wherein said cationic surfactant includes monoalkylammonium chloride, dialkylammonium chloride, tetramethylammonium chloride, trimethylphenylammonium chloride, or ethylene oxide-added ammonium chloride.

8. The process according to claim 6, wherein said cationic polymer or oligomer includes cation-modified product of polyacrylamide, copolymer of acrylamide and a cationic monomer, polyallylamine, polyamine sulfone, polyvinylamine, polyethyleneimine, polyamide-epichlorohydrin resin, or polyvinylpyridinium halide.

9. The process according to claim 1, wherein the black ink comprises an anionic compound and each of the color inks comprises a cationic compound.

10. The process according to claim 9 wherein said anionic compound includes anionic surfactant, anionic polymer or oligomer.

11. The process according to claim 10, wherein said anionic surfactant includes alkylbenzenesulfonate, salt of alkylsulfuric ester, alkylnaphthalenesulfonate, alkylphosphate, alkylsulfosuccinate, naphthalenesulfonic acid-formalin condensate or polyoxyethylene alkylphosphate.

12. The process according to claim 10, wherein said anionic polymer or oligomer includes carboxyl group-terminated polyester obtained by reacting a polycarboxylic acid with a polyhydric alcohol, acid cellulose derivative obtained by modification with polycarboxylic acid, homopolymer of vinyl ether polycarboxylate monomer, homopolymer of (meth)acrylic acid homopolymer of α, β-unsaturated vinyl monomer, sulfuric acid-modified polymer obtained by treating polyvinyl alcohol or vinyl alcohol copolymer with a sulfonic compound, ethylcellulose, benzylcellulose, hydroxyethylcellulose or hydroxypropylcellulose.

13. The process according to claim 9, wherein said cationic compound includes cationic surfactant, cationic polymer or oligomer.

14. The process according to claim 13, wherein said cationic surfactant includes monoalkylammonium chloride, dialkylammonium chloride, tetramethylammonium chloride, trimethylphenylammonium chloride, or ethylene oxide-added ammonium chloride.

15. The process according to claim 13, wherein said cationic polymer or oligomer includes cation-modified product of polyacrylamide, copolymer of acrylamide and a cationic monomer, polyallylamine, polyamine sulfone, polyvinylamine, polyethyleneimine, polyamide-epichlorohydrin resin, or polyvinylpyridinium halide.

16. The process according to claim 1, further comprising forming a transparent protective layer composed of a curable resin composition on the colored and black patterns.

17. The process according to claim 16, wherein the curable resin composition is a resin composition capable of curing by exposure to light.

18. The process according to claim 16, wherein the curable resin composition is a resin composition capable of curing by a heat treatment.

19. The process according to claim 1, wherein said resin layer has a thickness of from 0.1 to 20 μm.

20. The process according to claim 1, wherein a resin in said resin layer has heat resistance.

21. The process according to claim 9, wherein said resin is a material selected from the group consisting of polyvinyl pyrrolidone, polyvinyl alcohol, polyvinyl acetal polyurethane, carboxymethylcellulose, polyester, polyacrylic acid and esters thereof, hydroxyethylcellulose, melamine resin, albumin, gelatin, casein, starch, cationic starch, gum arabic, and sodium alginate.

22. The process according to claim 1, wherein said each of color inks contains dye or pigment.

23. The process according to claim 1, wherein said black ink contains dye or pigment.

24. The process according to claim 1, wherein said each of color inks contains an aqueous medium.

25. The process according to claim 24, wherein said aqueous medium contains a mixed solvent of water and at least one water-soluble organic solvent.

26. The process according to claim 1, wherein said black ink contains an aqueous medium.

27. The process according to claim 26, wherein said aqueous medium contains a mixed solvent of water and at least one water-soluble organic solvent.

28. A color filter produced by the process according to any one of claims 1 to 28.

* * * * *

UNITED STATES PATENT AND TRADEMARK OFFICE
CERTIFICATE OF CORRECTION

PATENT NO.    : 5,593,757
DATED         : January 14, 1997
INVENTOR(S)   : Akio KASHIWAZAKI, et al.

It is certified that error appears in the above-indentified patent and that said Letters Patent is hereby corrected as shown below:

ON THE TITLE PAGE:

Item[56] References Cited,

Under Foreign Patent Documents

"0123903   9/1982   Japan." should read --57-123903   9/1982   Japan--.

"01217320   8/1989   Japan." should be deleted.

"02228605   9/1990   Japan." should read --2-228605   9/1990   Japan--.

"0310220   1/1991   Japan." should read --3-10220   1/1991   Japan--.

"04317007   11/1992   Japan." should read --4-317007   11/1992   Japan--.

"04349401   12/1992   Japan." should read --4-349401   12/1992   Japan--.

"05288913   11/1993   Japan." should read --5-288913   11/1993   Japan--.

UNITED STATES PATENT AND TRADEMARK OFFICE
CERTIFICATE OF CORRECTION

PATENT NO. : 5,593,757
DATED : January 14, 1997
INVENTOR(S) : Akio KASHIWAZAKI, et al.

It is certified that error appears in the above-indentified patent and that said Letters Patent is hereby corrected as shown below:

COLUMN 4
Line 15, "As" should read --As is--.

Line 35, "Besides," should read --Besides these,--.

COLUMN 5
Line 45, "2" should read --2,--.

Line 50, "16" should read --16,--.

COLUMN 8
Line 17, "bass" should read --base--.

Line 26, "that" should read --in which--.

COLUMN 10
Line 37, "patterns" should read --patterns,--.

UNITED STATES PATENT AND TRADEMARK OFFICE
CERTIFICATE OF CORRECTION

PATENT NO. : 5,593,757
DATED : January 14, 1997
INVENTOR(S) : Akio KASHIWAZAKI, et al.

It is certified that error appears in the above-indentified patent and that said Letters Patent is hereby corrected as shown below:

COLUMN 12

Line 18, "9," should read --20,--.

Signed and Sealed this

Eighth Day of July, 1997

Attest:

BRUCE LEHMAN

Attesting Officer

Commissioner of Patents and Trademarks